(No Model.)
W. M. MOORE.
SCROLL SAW.
No. 360,813. Patented Apr. 5, 1887.
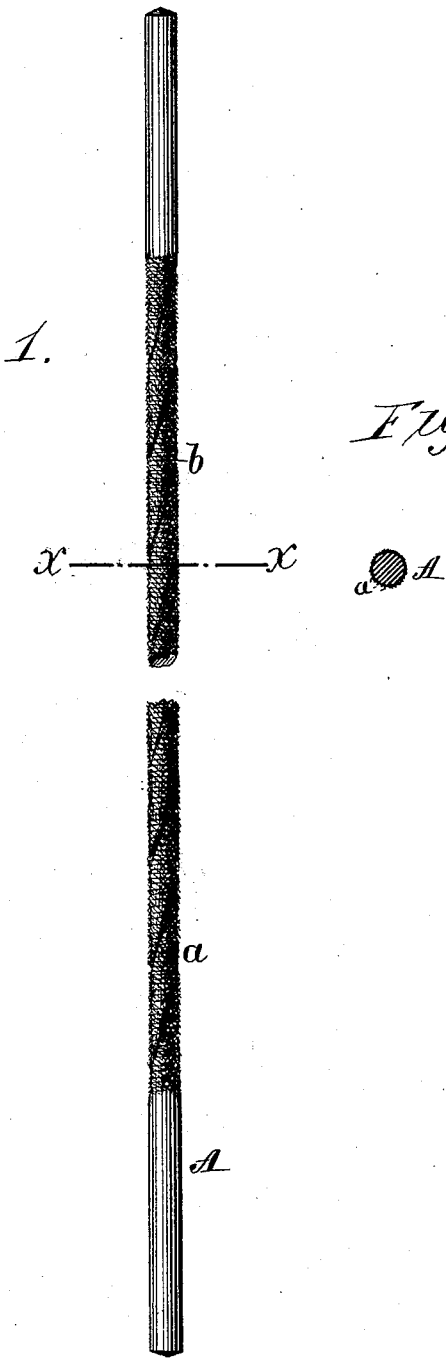
WITNESSES:
INVENTOR:
W. M. Moore
BY Munn & Co.
ATTORNEYS.

UNITED STATES PATENT OFFICE.

WILLIAM MARQUIS MOORE, OF EMPIRE CITY, COLORADO, ASSIGNOR OF ONE-HALF TO SILAS HANCHETT, OF SAME PLACE.

SCROLL-SAW.

SPECIFICATION forming part of Letters Patent No. 360,813, dated April 5, 1887.

Application filed May 19, 1886. Serial No. 202,681. (No model.)

*To all whom it may concern:*

Be it known that I, WILLIAM MARQUIS MOORE, of Empire City, county of Clear Creek, and State of Colorado, have invented a new and useful Improvement in Cylindrical Scroll-Saws, of which the following is a specification, reference being had to the annexed drawings, forming a part thereof, in which—

Figure 1 is a side elevation of my improved saw. Fig. 2 is a transverse section taken on line *x x* in Fig. 1.

Similar letters of reference indicate corresponding parts in both figures of the drawings.

The object of my invention is to provide a saw which will cut in every direction without being turned and without the necessity of turning the work being sawed.

The invention consists in the peculiar construction and formation of the teeth and groove in the bar, as hereinafter fully described, and pointed out in the claim.

My improved saw is more particularly designed for the use of scroll-sawyers and those requiring a saw that may be made to follow a great variety of curves running in different directions through the work; but it may be applied to the sawing of metals and to the smoothing and finishing of work already done by means of ordinary saws.

Upon the round steel wire A are formed cone-shaped and spirally-arranged teeth *a*, similar to the teeth of a file, the teeth projecting in all directions from the periphery of the saw. These teeth are formed by running a piece of round steel wire of the required size through a series of knurl-wheels, the surface being knurled so as to leave one or more spiral grooves, *b*, extending along the entire cutting surface.

The ends of the wire of which the saw is formed are left plain to receive the clamps by which they are secured in the sawing-machine. By arranging the teeth on all sides of the saw the uneven heating by friction is avoided, as the saw is enabled to clear itself.

The saw is readily adjusted in the sawing-machine. There is no care required to bring the teeth into working position. It saws more rapidly than saws of the old style, as it permits the sawyer to follow his pattern continuously in any direction without being required to stop and turn the work, as the saw cuts equally well on all sides.

My improved saw cuts smoothly, as its action is similar to that of a file. It is more durable than an ordinary saw, as it is provided with a greater number of teeth, thereby dividing up the wear, which in an ordinary saw comes on a single series of teeth.

I am aware that a saw-blade consisting of a round bar provided with struck-up teeth on its surface is old, and I am also aware that a round saw-blade having cut-away teeth and spiral grooves is old, and I therefore do not claim such inventions.

Having thus described my invention, what I claim as new, and desire to secure by Letters Patent, is—

As an improved article of manufacture, a cylindrical scroll-saw consisting of a round bar having cone-shaped and spirally-arranged teeth *a* and spiral grooves *b* impressed into the bar, as set forth.

WILLIAM MARQUIS MOORE.

Witnesses:
 LAFAYETTE HANCHETT,
 DERESTUS S. LAMBERT.